(12) United States Patent
Malischewski et al.

(10) Patent No.: US 10,774,726 B2
(45) Date of Patent: Sep. 15, 2020

(54) VALVE FOR ADJUSTING A COOLING FLUID FLOW FOR PISTON COOLING

(71) Applicant: MAN Truck & Bus AG, Munich (DE)

(72) Inventors: Thomas Malischewski, Heilsbronn (DE); Jens Dietrich, Heilsbronn (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 16/156,523

(22) Filed: Oct. 10, 2018

(65) Prior Publication Data

US 2019/0107033 A1   Apr. 11, 2019

(30) Foreign Application Priority Data

Oct. 11, 2017  (DE) .................. 10 2017 123 664

(51) Int. Cl.

| | |
|---|---|
| *F01P 3/10* | (2006.01) |
| *F01M 1/08* | (2006.01) |
| *F16K 15/02* | (2006.01) |
| *F16K 17/04* | (2006.01) |
| *F01P 3/08* | (2006.01) |
| *F16K 31/122* | (2006.01) |
| *F01P 3/00* | (2006.01) |

(52) U.S. Cl.
CPC .................. *F01P 3/10* (2013.01); *F01M 1/08* (2013.01); *F01P 3/08* (2013.01); *F16K 15/026* (2013.01); *F16K 17/046* (2013.01); *F16K 31/1221* (2013.01); *F01M 2001/083* (2013.01); *F01P 2003/006* (2013.01)

(58) Field of Classification Search
CPC ..... F01M 1/08; F01M 1/16; F01P 3/08; F01P 2003/006; F01P 2007/146
See application file for complete search history.

(56) References Cited

U.S. PATENT DOCUMENTS

| | | | |
|---|---|---|---|
| 5,819,692 A | 10/1998 | Schafer | |
| 7,055,491 B2* | 6/2006 | Linderyd | .................. F02B 1/12 123/256 |
| 2006/0076193 A1 | 4/2006 | Ruther et al. | |

(Continued)

FOREIGN PATENT DOCUMENTS

| | | |
|---|---|---|
| DE | 10261180 A1 | 7/2004 |
| DE | 102005022460 A1 | 11/2006 |

(Continued)

OTHER PUBLICATIONS

European Office Action issued in European Patent Application No. 18194699.7 dated Feb. 18, 2020, 3 pages. No English translation available.

*Primary Examiner* — Long T Tran
(74) *Attorney, Agent, or Firm* — Weber Rosselli & Cannon LLP

(57) ABSTRACT

A valve for adjusting a cooling fluid flow from a fluid source to a plurality of injection nozzles for cooling a plurality of pistons of an internal combustion engine is provided. The valve has a fluid duct for connecting the fluid source to the plurality of injection nozzles, and a valve element which is arranged so as to be movable, in particular displaceable, in order to change a flow cross-section of the fluid duct. The valve element can be moved into a first position, in which the flow cross-section is not influenced by the valve element.

17 Claims, 3 Drawing Sheets

(56) References Cited

U.S. PATENT DOCUMENTS

| | | | |
|---|---|---|---|
| 2014/0255222 A1 | 9/2014 | Ono et al. | |
| 2015/0377115 A1* | 12/2015 | Shinagawa | F01P 11/14 |
| | | | 123/41.15 |
| 2016/0186642 A1* | 6/2016 | Honda | F01M 1/08 |
| | | | 123/41.35 |
| 2016/0305363 A1* | 10/2016 | Leone | F02F 1/18 |

FOREIGN PATENT DOCUMENTS

| | | |
|---|---|---|
| DE | 102007055264 A1 | 1/2009 |
| DE | 102011007605 A1 | 11/2011 |
| DE | 112013006598 | 12/2015 |
| JP | H07317519 A | 12/1995 |
| JP | H08246871 A | 9/1996 |
| JP | 2006138307 A | 6/2006 |

\* cited by examiner

VALVE FOR ADJUSTING A COOLING FLUID FLOW FOR PISTON COOLING

TECHNICAL FIELD

The invention relates to a valve for adjusting a cooling fluid flow for cooling a plurality of pistons and a device for cooling a plurality of pistons.

BACKGROUND

Oil injection nozzles can be used to cool pistons. The oil injection nozzles can inject oil at a lower side of the pistons in order to cool the pistons.

DE 10 2005 022 460 A1 discloses a method for operating a piston cooling system of an internal combustion engine. An oil injection nozzle having a nozzle valve is connected to an oil supply unit. The nozzle valve is opened via an oil pressure. Lubrication oil is pumped by means of an oil pump into an oil duct and the oil injection nozzle is supplied with lubrication oil. The oil injection nozzle is deactivated via a change of the oil pressure in the oil supply unit in accordance with requirements. A ball valve which is acted on with resilient force is provided as the nozzle valve.

U.S. Pat. No. 5,819,692 A discloses an engine lubrication system having a tubular valve element which is arranged in a main oil passage. An oil flow is controlled via the valve element into branch passages which lead to spray nozzles in accordance with a piston cooling requirement. The valve element is actuated by a thermostatic power element.

The invention is based on a system having a central valve for a plurality of injection nozzles. An object of the invention is to provide an alternative or improved valve, with which disadvantages in the prior art can be overcome. In particular, the valve should allow piston cooling in accordance with requirements and not consume unnecessary drive power of a fluid pump.

SUMMARY

The object is achieved by a valve and a device according to the independent claims. Advantageous developments are set out in the dependent claims and the description.

The valve can particularly be constructed as a throttle valve. The valve is suitable for adjusting a cooling fluid flow from a fluid source to a plurality of injection nozzles for cooling a plurality of pistons of an internal combustion engine. The valve has a fluid duct for connecting the fluid source to the plurality of injection nozzles. The valve has a valve element which is arranged so as to be movable, in particular displaceable, in order to change a flow cross-section of the fluid duct. The valve element can be moved, in particular displaced, into a first position, in which the flow cross-section is not influenced by the valve element.

In the completely open state, the valve does not consume any unnecessary drive power of the fluid pump. The reason for this is that the valve element in the completely open state of the valve is in the first position, in which the flow cross-section is not influenced by the valve element. That is to say, the valve element does not bring about any pressure loss when the valve is completely opened.

In particular, a movement of the valve element may be dependent on a fluid pressure of the cooling fluid. The valve may allow cooling of the pistons according to requirements in that it opens in accordance with a fluid pressure of the cooling fluid. At higher engine powers, the fluid pump makes more cooling fluid available at a higher pressure. The valve can then open further in accordance with requirements so that the increased cooling requirement of the pistons can be covered.

It is also possible, for example, for the valve element to be able to be moved, in particular displaced, in accordance with a temperature of the cooling fluid.

It is also possible for the valve element to be pivotable. For example, the valve element may be constructed as a butterfly valve, in particular a throttle valve. Preferably, the butterfly valve may be resiliently loaded. In particular, the valve element may be positioned in the first position in a valve pocket of the fluid duct.

In particular, the valve may be arranged in a piston gallery and/or a main cooling fluid duct which is arranged upstream of the plurality of injection nozzles.

In a particularly preferred embodiment, the valve element in the first position allows the cooling fluid flow to flow through the fluid duct substantially without any loss of pressure. This means that the valve element in the first position does not itself bring about any pressure loss of the cooling fluid flowing through the fluid duct. In particular, no portion of the valve element is located in the way of the flow of the cooling fluid in the first position of the valve element.

Preferably, the flow cross-section of the fluid duct in the first position of the valve element is at a maximum.

In an embodiment, the valve element is moved with increasing fluid pressure of the cooling fluid in a direction towards the first position so that the flow cross-section is increased. Alternatively or additionally, the valve element is moved with decreasing fluid pressure of the cooling fluid in a direction counter to the first position so that the flow cross-section is reduced. Consequently, the valve allows more fluid to pass at higher fluid pressures so that a higher piston cooling requirement can be covered.

In another embodiment, the valve element is positioned in the first position outside the fluid duct. It is ensured as a result that the valve element in the first position does not bring about any undesirable pressure loss in the fluid duct, as would be the case, for example, in resiliently loaded non-return ball valves.

In an embodiment, the fluid duct has a/an (valve element) opening through which the valve element can be moved, in particular displaced. As a result, the valve element can be pushed through the opening into the fluid duct in order to reduce the flow cross-section of the fluid duct. On the other hand, the valve element can be pushed through the opening out of the fluid duct in order to increase the flow cross-section of the fluid duct.

In a preferred embodiment, the valve is a piston valve. In other words, the valve element is a (pressure-actuated) piston.

In another embodiment, the valve element has a control face which preferably extends perpendicularly to a displacement axis of the valve element. The cooling fluid acts on the control face in order to displace the valve element so that the valve element is displaced in accordance with the fluid pressure of the cooling fluid.

In a construction variant, the valve is constructed as a straight-way valve. In this instance, the inlet and outlet are located in a common direction or the fluid duct of the valve extends rectilinearly.

In a development, the control face is arranged in a control fluid chamber which is arranged outside the fluid duct. A supply duct directs cooling fluid from upstream of the valve element into the control fluid chamber. As a result, for example, in a straight-way valve a displacement of the valve element can be brought about in such a manner that the valve element can be completely displaced out of the fluid duct.

In another construction variant, the valve is constructed as a corner valve. In a corner valve, the inlet and outlet are at an angle, in particular at right-angles, relative to each other. The fluid duct extends in an angled manner.

In a development, the control face is an end face of the valve element. For example, in the case of a corner valve, a displacement of the valve element can thereby be produced in such a manner that the valve element can be displaced completely out of the fluid duct.

In another construction variant, the valve has a leakage duct for cooling fluid which has escaped from the fluid duct (for example, via the valve element opening in the fluid duct and/or via the control fluid chamber).

In an embodiment, the valve element is pretensioned counter to the first position, in particular by a resilient element (for example, a helical spring). As a result, the valve opens with increasing fluid pressure counter to the pretensioning by the resilient element.

In another embodiment, the valve element can be moved, in particular displaced, between the first position and a second position, in which the flow cross-section is at a minimum or zero. In variants in which the flow cross-section is minimised in the second position but is greater, it is ensured that a small amount of cooling fluid is always directed to the injection nozzles. In variants in which the flow cross-section is zero in the second position, a cooling fluid flow to the injection nozzles can be completely blocked.

In an embodiment, the second position is delimited by a stop for the valve element. The stop may be a portion of the valve element opening of the fluid duct.

The invention also relates to a device for cooling a plurality of pistons of an internal combustion engine. The device has a plurality of injection nozzles which are preferably provided without individual fluid valves. The device has a fluid source, in particular an oil pump. The device has a valve as disclosed herein, which is provided in fluid connection downstream of the fluid source and upstream of the plurality of injection nozzles.

The device affords the same advantages as the valve disclosed herein. The injection nozzles do not require any individual fluid valves because the valve of the device is provided as a central valve for all the injection nozzles. A substantially simpler structure which is less prone to failure is produced with respect to solutions which provide an individual fluid valve for each injection nozzle.

The invention also relates to a motor vehicle, in particular a utility vehicle (for example, a lorry or a bus). The motor vehicle has a valve as disclosed herein or a device as disclosed herein.

It is also possible to use the valve and/or the device as disclosed herein, for example, for passenger vehicles, large engines, off-road vehicles, stationary engines, marine engines, etc.

BRIEF DESCRIPTION OF THE DRAWINGS

The above-described preferred embodiments and features of the invention can be freely combined with each other. Additional details and advantages of the invention will be described below with reference to the appended drawings, in which.

DETAILED DESCRIPTION

Figure 1:
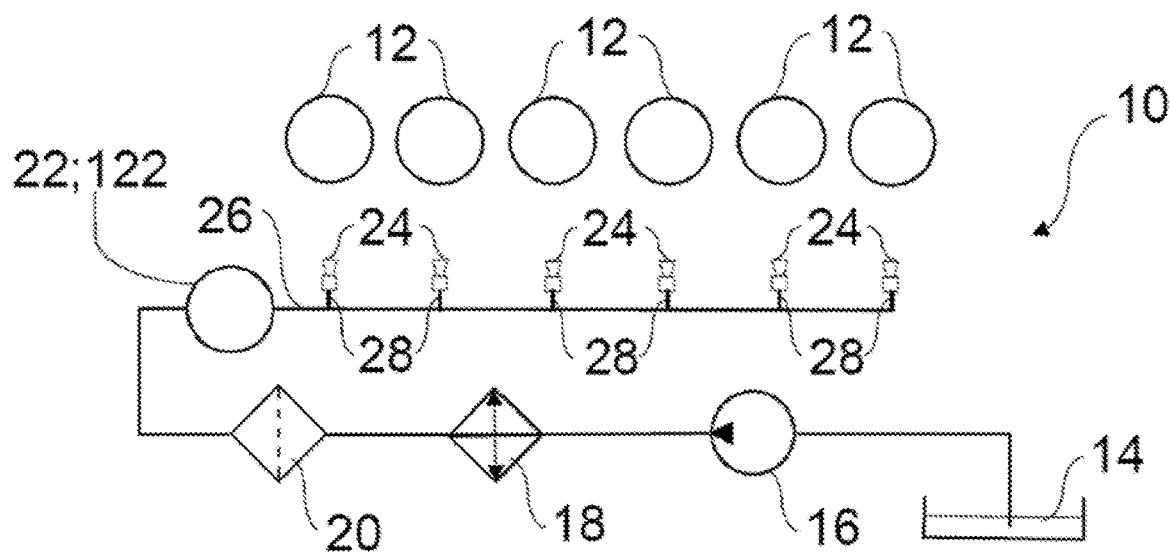
FIG. 1 is a schematic illustration of a device for cooling pistons of an internal combustion engine.

The embodiments shown in the Figures at least partially correspond to each other so that similar or identical components are indicated with the same reference numerals and reference may also be made to the description of the other embodiments or Figures for the explanation thereof in order to avoid repetition.

FIG. 1 shows a device 10 for cooling and lubricating a plurality of pistons 12 of an internal combustion engine. The internal combustion engine may be provided, for example, in a motor vehicle, in particular a utility vehicle, for driving it. The utility vehicle may be, for example, a bus or a lorry.

The device 10 has a fluid reservoir 14, a fluid pump 16, a fluid cooler 18, a fluid filter 20, a valve 22; 122 and a plurality of injection nozzles (piston cooling nozzles) 24.

The fluid reservoir 14 may be constructed, for example, as an oil pan of the internal combustion engine. A lubricating fluid, for example oil, may be used as the cooling fluid of the device 10 for cooling and lubricating the pistons 12.

The fluid pump 16 draws in the cooling fluid/lubricating fluid. The fluid pump 16 may be constructed as an oil pump. The fluid pump 16 may be a controllable pump. A fluid flow which is provided by the fluid pump 16 can be directed to the fluid cooler 18 for cooling. The cooled fluid flow can be directed to the fluid filter 20. The cooled and filtered fluid flow is available downstream of the fluid filter 20 for lubricating and cooling components of the internal combustion engine, for example, the piston 12.

The fluid flow is directed to the valve 22; 122. The valve 22; 122 is constructed as a throttle valve for throttling the fluid flow. The fluid flow which is directed to the injection nozzles is adjusted via the valve 22; 122. The valve 22; 122 is provided upstream of the plurality of injection nozzles 24. In detail, the valve 22; 122 is provided upstream of a main cooling fluid duct 26 which branches into a plurality of individual cooling fluid ducts 28. The individual cooling fluid ducts 28 direct the fluid flow from the main cooling fluid duct 26 to the plurality of injection nozzles 24. The valve 22; 122 may be arranged, for example, in a piston cooling gallery of the internal combustion engine.

The injection nozzles 24 act as piston cooling nozzles. The injection nozzles 24 may be provided without any individual valves. The injection nozzles 24 inject the cooling fluid from below towards the pistons 12 so that the pistons 12 are cooled during operation. Finally, the injected cooling fluid arrives back in the fluid reservoir 14. As a result, the device 10 forms a fluid circuit.

Figure 2:
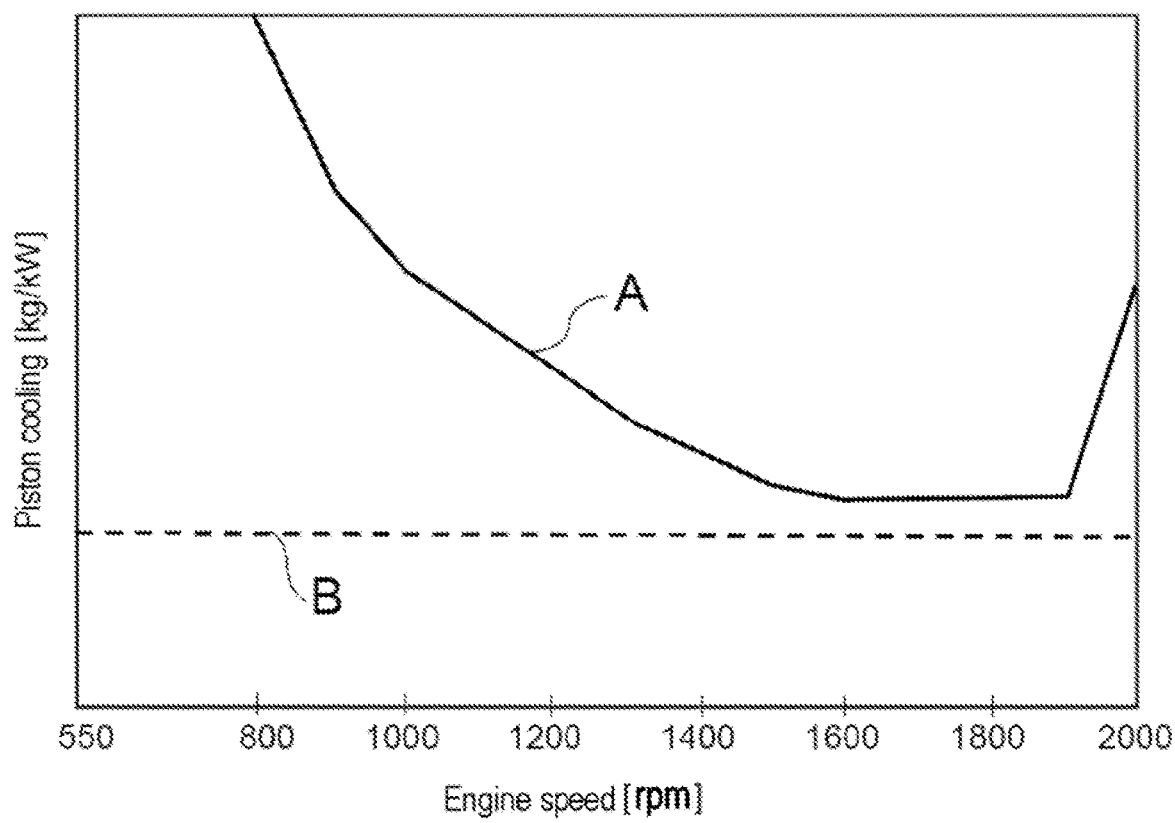
FIG. 2 is a graph which shows two piston cooling lines in accordance with an engine speed.

FIG. 2 shows two piston cooling paths against an engine speed of an internal combustion engine.

In principle, a cooling requirement of the pistons of an internal combustion engine can be connected to the engine power. For example, it may be necessary to provide per kilowatt of engine power lubricating fluid in a range from 4 to 7 kg/h for cooling the pistons via injection nozzles.

A solid line A shows an exemplary conventional actual piston cooling. A broken line B shows an exemplary desired piston cooling. For the line A, a rigid fluid pump is used and no control takes place. As can be seen, a substantially increased cooling provision for the pistons is provided in a low speed range. In the range between 600 rpm and 1400 rpm, consumers such as a turbocharger or bearings (for example, main bearing and connecting rod bearing of the crankshaft) determine the required fluid pressure. The line B shows that the desired piston cooling power is constant in kilogrammes per kilowatt of engine power against the engine speed.

During a comparison of lines A and B, it is further evident that the conventional piston cooling particularly provides a substantially excessive cooling supply for the piston in the main driving range of a utility vehicle between 1000 rpm and 1400 rpm. An unnecessarily high energy consumption of the fluid pump is associated therewith.

The present disclosure is directed inter alia towards bringing the actual piston cooling towards the desired piston cooling. With reference to FIG. 1, it is proposed in this regard that the valve 22; 122 be arranged in or upstream of the main cooling fluid duct 26. The valve 22; 122 is provided as a central valve for all the injection nozzles 24. As explained in detail with reference to the following embodiments, the valve 22; 122 is provided to adapt the (cooling) fluid flow for the injection nozzles 24 to the actual requirement of the pistons 12. To this end, the valve 22; 122 opens to an increasing extent, for example, with an increasing fluid pressure, so that at higher fluid pressures more fluid is directed to the injection nozzles 24. It is additionally proposed that the valve 22; 122 be constructed so that it produces substantially no pressure loss of the fluid flow flowing through in the completely open state. As a result, in particular a disadvantage of the resiliently loaded non-return ball valve can be overcome which also generate a substantial pressure loss as a result of the construction when fully open in that a valve ball of the non-return valve is positioned centrally in the fluid duct and has to be flowed around by the fluid flow. This increase of pressure loss in the non-return ball valve must be applied by the fluid pump and costs unnecessary drive power. However, the valve 22; 122 is constructed in such a manner that, when the valve 22; 122 is completely open, no pressure loss is brought about by the valve element. Consequently, no unnecessary drive power is necessary to compensate for a pressure loss.

Figure 3:
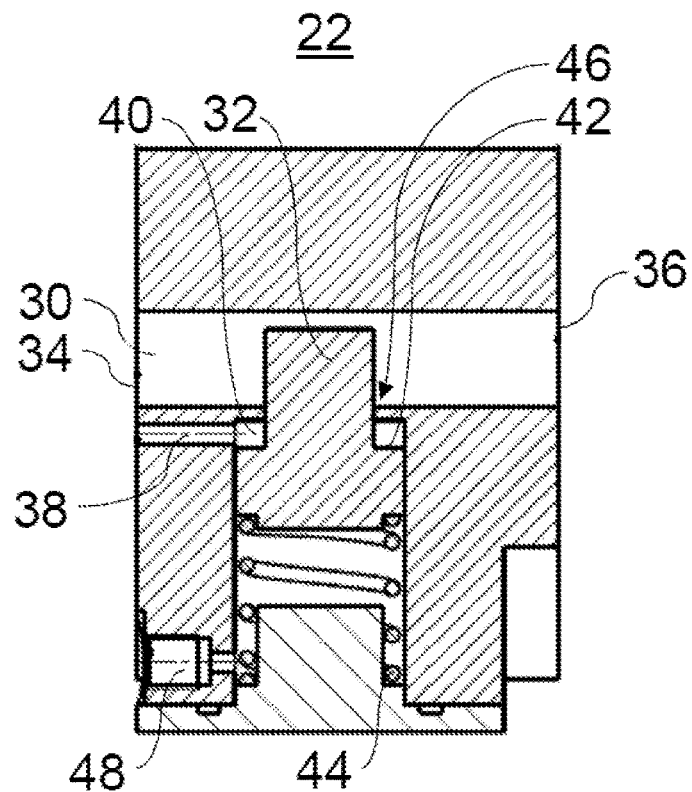
FIG. 3 shows a valve having a deployed valve element according to a first embodiment of the present disclosure.
Figure 4:
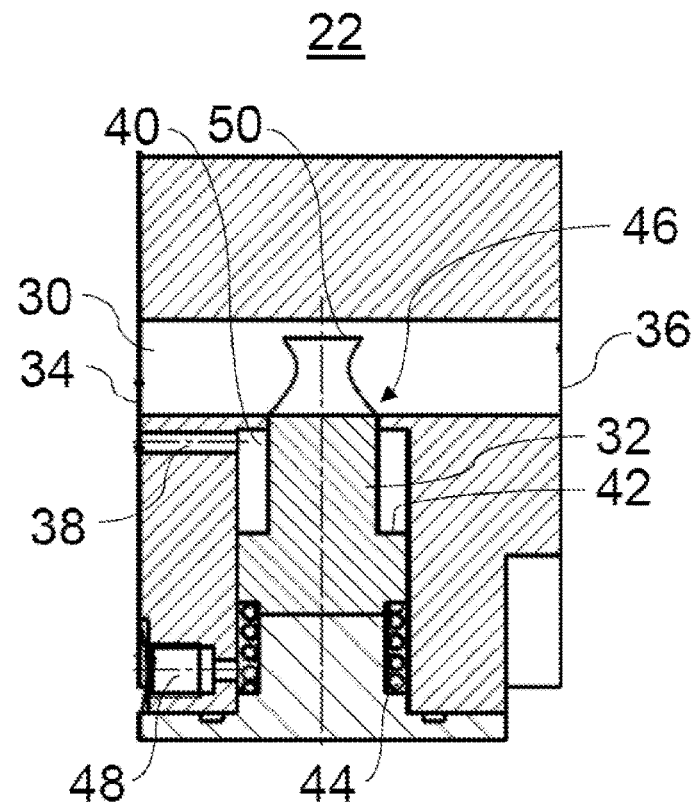
FIG. 4 shows the valve having a retracted valve element according to the first embodiment of the present disclosure.

FIGS. 3 and 4 show a first embodiment of the valve 22. The valve 22 has a fluid duct 30 and a valve element 32.

The fluid duct 30 extends rectilinearly between an inlet opening 34 and an outlet opening 36. As a result, the valve 22 is constructed as a straight-way valve.

The valve element 32 can be displaced into the fluid duct 30 in order to reduce a flow cross-section of the fluid duct 30. Similarly, the valve element 32 can be displaced out of the fluid duct 30 in order to increase a flow cross-section of the fluid duct 30. The valve element 32 acts as a piston. As a result, the valve 22 is constructed as a piston valve.

A displacement of the valve element 32 is brought about by a pressure of the cooling fluid. As a result, the valve element 32 is a valve actuated by an inherent medium. In detail, cooling fluid is directed via a supply duct 38 to a control fluid chamber 40 of the valve 22 from a location upstream of the valve element 32. The cooling fluid directed into the control fluid chamber 40 fills the control fluid chamber 40 and abuts a control face 42 of the valve element 32. With increasing fluid pressure, the valve element 32 can be displaced counter to a resilient force of a resilient element 44 of the valve 22.

In particular, the valve element 32 can be displaced between a position illustrated in FIG. 3 and a position illustrated in FIG. 4. With increasing fluid pressure, the valve element 32 is displaced in a direction towards the position illustrated in FIG. 4. With decreasing fluid pressure, the valve element 32 is displaced in a direction towards the position illustrated in FIG. 3. The valve element 32 is pretensioned in a direction towards the position illustrated in FIG. 3 by the resilient element 44, for example, a helical spring. In detail, the valve element 32 is pushed through an opening 46 in the fluid duct 30 into or out of the fluid duct 30. The form of a region of the opening 46 as illustrated in FIG. 4 is produced in the case of a cylindrical form of the fluid duct 30 and a cylindrical form of the valve element 32 so that the valve element 32 can substantially be displaced relative to the fluid duct 30 in a sealing manner towards the opening 46.

In the position of the valve element 32 illustrated in FIG. 3, a flow cross-section of the fluid duct 30 is at a minimum but greater than zero. As a result, a cooling fluid flow to the injection nozzles 24 (see FIG. 1) is never completely interrupted. In other embodiments, however, it is also possible for the flow cross-section of the fluid duct 30 to be set to zero.

In the position of the valve element 32 illustrated in FIG. 4, a flow cross-section of the fluid duct 30 is at a maximum. In this case, it should be particularly emphasised that the valve element 32 does not influence the flow cross-section of the fluid duct 30 at all. Instead, the valve element 32 is positioned outside the fluid duct 30. At a great fluid pressure, consequently, the valve 22 opens completely and the valve element 32 does not bring about any pressure loss.

Furthermore, the valve 22 has a leakage duct 48 for guiding back leakage fluid. Cooling fluid which has escaped from the fluid duct 30 and the control fluid chamber 40 can be discharged via the leakage duct 48.

In the embodiment illustrated, the valve element 32 in the position illustrated in FIG. 3 cannot close further because the valve element 32 abuts a stop 50 (see FIG. 4). The stop 50 may be an edge of the opening 46.

Figure 5:
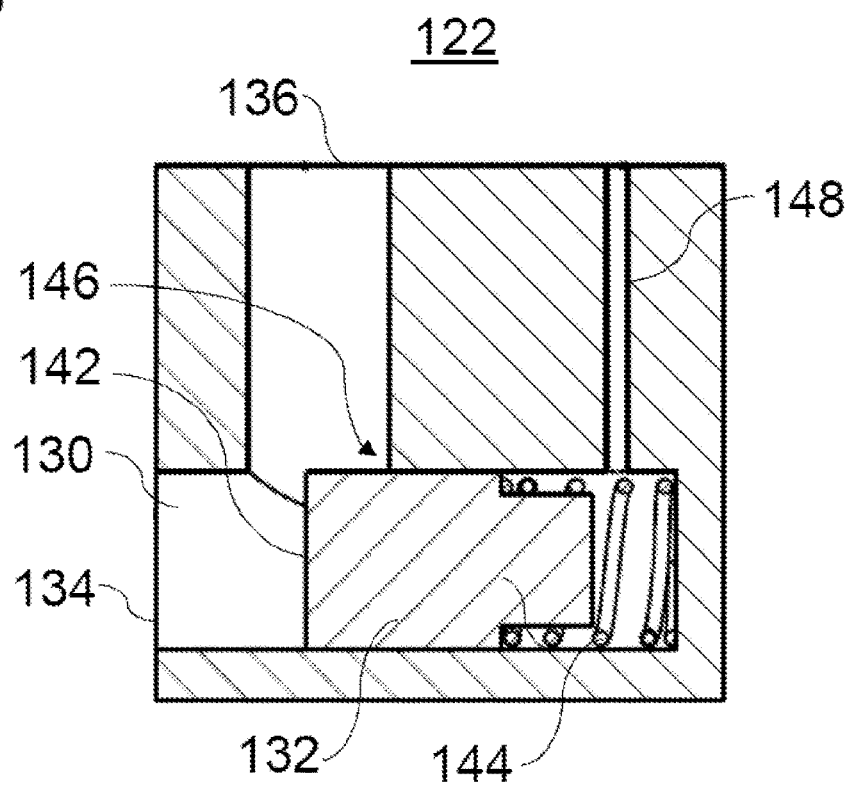
FIG. 5 shows a valve having a deployed valve element according to a second embodiment of the present disclosure.
Figure 6:
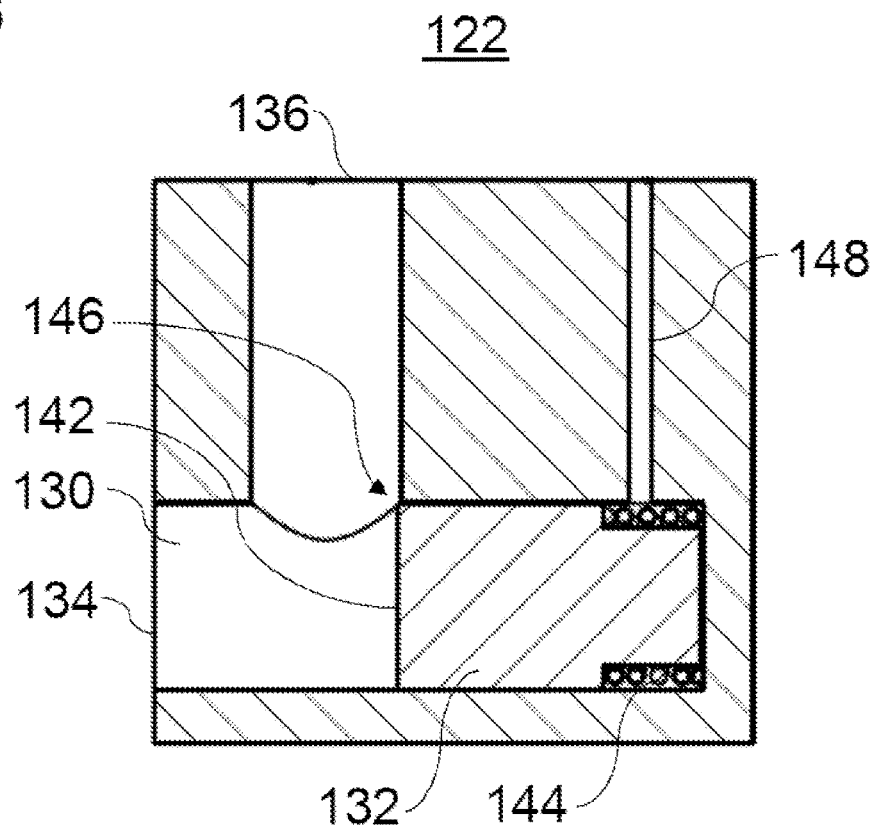
FIG. 6 shows a valve having a retracted valve element according to the second embodiment of the present disclosure.

FIGS. 5 and 6 show a second embodiment of the central valve of FIG. 1 which is designated 122 in this instance for greater distinctiveness.

The valve 122 has a fluid duct 130 and a valve element 132. The valve 122 is again a piston valve and is actuated by an inherent medium.

The fluid duct 130 extends between an inlet opening 134 and an outlet opening 136 at right-angles. As a result, the valve 122 is constructed as a corner valve.

The valve element 132 functions in principle in the manner of the valve element 32 of the valve 22 of FIGS. 3 and 4. The valve element 132 can be displaced between a position illustrated in FIG. 5 and a position illustrated in FIG. 6. Unlike the first embodiment, the valve element 132 has an end face of the valve element 32 as a control face 142, which end face faces in the direction towards the inlet opening 134.

With increasing fluid pressure, the valve element 132 can be pushed in a direction counter to the resilient force of the resilient element 144 through an opening 146 in the fluid duct 130 out of the fluid duct 130. Cooling fluid which escaped from the fluid duct 130 can be discharged via the leakage duct 148.

The valve 122 can be used, for example, in the form of a plug-in valve for insertion into a blind hole.

The invention is not limited to the above-described preferred embodiments. Instead, a large number of variants and modifications which also make use of the inventive notion and which are therefore included in the protective scope are possible. In particular, the invention also claims protection for the subject-matter and the features of the dependent claims irrespective of the claims referred to. In particular, the features of the independent claim 1 are disclosed independently of each other. In addition, the features of the dependent claims are also disclosed independently of all the features of the independent claim 1 and, for example, independently of the features with respect to the presence and/or the configuration of the fluid duct and/or the valve element of the independent claim 1.

LIST OF REFERENCE NUMERALS

10 Device for piston cooling
12 Piston
14 Fluid reservoir
16 Fluid pump (fluid source)
18 Fluid cooler
20 Fluid filter
22, 122 Valve
24 Injection nozzle
26 Main cooling fluid duct
28 Individual cooling fluid duct
30, 130 Fluid duct
32, 132 Valve element (piston)
34, 134 Inlet opening
36, 136 Outlet opening
38 Supply duct
40 Control fluid chamber
42, 142 Control face
44, 144 Resilient element
46, 146 Valve element opening
48, 148 Leakage duct
50 Stop

The invention claimed is:

1. A valve for adjusting a cooling fluid flow from a fluid source to a plurality of injection nozzles for cooling a plurality of pistons of an internal combustion engine, comprising:
a fluid duct for connecting the fluid source to the plurality of injection nozzles; and
a valve element configured to be arranged so as to be movable in order to change a flow cross-section of the fluid duct, wherein the valve element can be moved into a first position, in which the flow cross-section is not influenced by the valve element, wherein the valve element has a control face, wherein the cooling fluid acts on the control face in order to displace the valve element so that the valve element is displaced in accordance with the fluid pressure of the cooling fluid, wherein the valve is a straight-way valve, wherein the control face is arranged in a control fluid chamber which is arranged outside the fluid duct, and a supply duct directs cooling fluid from upstream of the valve element into the control fluid chamber, and wherein the valve element is moved with increasing fluid pressure of the cooling fluid in the control fluid chamber in a direction towards the first position so that the flow cross-section is increased, and/or the valve element is moved with decreasing fluid pressure of the cooling fluid in the control fluid chamber in a direction counter to the first position so that the flow cross-section is reduced.

2. The valve according to claim 1, wherein:
the valve element in the first position allows the cooling fluid flow to flow through the fluid duct substantially without any loss of pressure, and/or
the valve element in the first position does not bring about any pressure loss of the cooling fluid flowing through the fluid duct.

3. The valve according to claim 1, wherein the valve element is positioned in the first position outside the fluid duct.

4. The valve according to claim 1, wherein the fluid duct has an opening, through which the valve element can be moved.

5. The valve according to claim 1, wherein the valve is a piston valve.

6. The valve according to claim 1, wherein:
the control face extends perpendicularly to a displacement axis of the valve element.

7. The valve according to claim 6, wherein:
the valve is a corner valve, and
the control face is an end face of the valve element.

8. The valve according to claim 1, further comprising a leakage duct for cooling fluid which has escaped from the fluid duct.

9. The valve according to claim 1, wherein the valve element is pretensioned counter to the first position, by a resilient element.

10. The valve according to claim 1, wherein the valve element can be moved between the first position and a second position, in which the flow cross-section is at a minimum or zero.

11. The valve according to claim 10, wherein the second position is delimited by a stop for the valve element.

12. A device for cooling a plurality of pistons of an internal combustion engine, comprising:
a plurality of injection nozzles which are provided without individual fluid valves;
a fluid source; and
a valve according to claim 1, which is provided in fluid connection downstream of the fluid source and upstream of the plurality of injection nozzles.

13. The device according to claim 12, wherein the fluid source is an oil pump.

14. A motor vehicle comprising a device for cooling a plurality of pistons of an internal combustion engine according to claim 12.

15. A motor vehicle comprising a valve for adjusting a cooling fluid flow according to claim 1.

16. The valve according to claim 1, wherein the valve is a throttle valve.

17. The motor vehicle according to claim 15, wherein the motor vehicle is a utility vehicle.

* * * * *